June 11, 1963 H. S. EADIE 3,093,713

ELECTRICAL COMPONENT ASSEMBLY

Filed Nov. 6, 1959 2 Sheets-Sheet 1

INVENTOR.
Hugh S. Eadie
BY
Olson, Mecklenburger, von Holst, Pendleton & Neuman Attys June 11, 1963 H. S. EADIE 3,093,713

ELECTRICAL COMPONENT ASSEMBLY

Filed Nov. 6, 1959

2 Sheets-Sheet 2

INVENTOR.
Hugh S. Eadie
BY
Olson, Mecklenburger, von Holst, Pendleton & Neuman. Attys.

United States Patent Office
3,093,713
Patented June 11, 1963

3,093,713
ELECTRICAL COMPONENT ASSEMBLY
Hugh S. Eadie, Palatine, Ill., assignor to The Grigsby Company, Inc., Arlington Heights, Ill., a corporation of Delaware
Filed Nov. 6, 1959, Ser. No. 851,372
9 Claims. (Cl. 200—14)

This invention relates to an improved electrical component assembly and, more particularly, to an improved rotary switch assembly.

Rotary switches having a plurality of layers or wafers assembled in stacked relationship on a common shaft are quite common in modern electronic equipment. Conventionally, each switch section has an annular insulating support with a plurality of conductive poles mounted circumferentially thereon. A centrally mounted rotary element carrying an annular metallic wiper completes circuits between the various poles in selected combinations as a result of the particular angular position of the rotary member.

The stacked rotary switch in most general use today is assembled by the use of two or more long bolts passing through aligned apertures in the various wafers with cylindrical spacers carried by the bolts to maintain the various wafers in generally parallel spaced relationship. Such an assembly involves many parts which are expensive to manufacture and difficult and expensive to assemble. Furthermore, the bolts and cylindrical spacers introduce electrical interference if they are not carefully electrically interconnected by auxiliary means. Also, the bolts and spacers are bulky and cumbersome, increasing the over-all size of the rotary switch assembly.

It is, therefore, one important object of this invention to provide an improved electrical component assembly requiring a minimum number of parts.

It is still another object of this invention to provide an improved electrical switch assembly having enhanced rigidity with a reduced number of parts.

It is still a further object of this invention to provide an improved method for the manufacture and assembly of a plurality of multiple-pole rotary switches in a single aligned unit.

It is still another object of this invention to provide an improved rotary switch having enhanced physical appearance and requiring less space for mounting.

Another object of this invention is to provide an improved method of assemblying a rotary switch which may be performed by hand, as illustrated and described hereinafter, or may be readily incorporated in an automatic assembly process.

Further and additional objects of this invention will become manifest from a consideration of this description, the appended claims, and the accompanying drawings.

In one form of this invention, a plurality of switch sections, each having an annular insulating web carrying spaced, conductive contacts and a central rotary member for interconnecting those contacts electrically, are assembled in substantially parallel relationship between two unitary elongate struts uniquely apertured, preformed, and aligned to rigidly mount the various switch sections. Also forming a part of this invention is the unique method for assembling switches of this type.

For a more complete understanding of this invention, reference will now be made to the accompanying drawings wherein.

Figure 1:
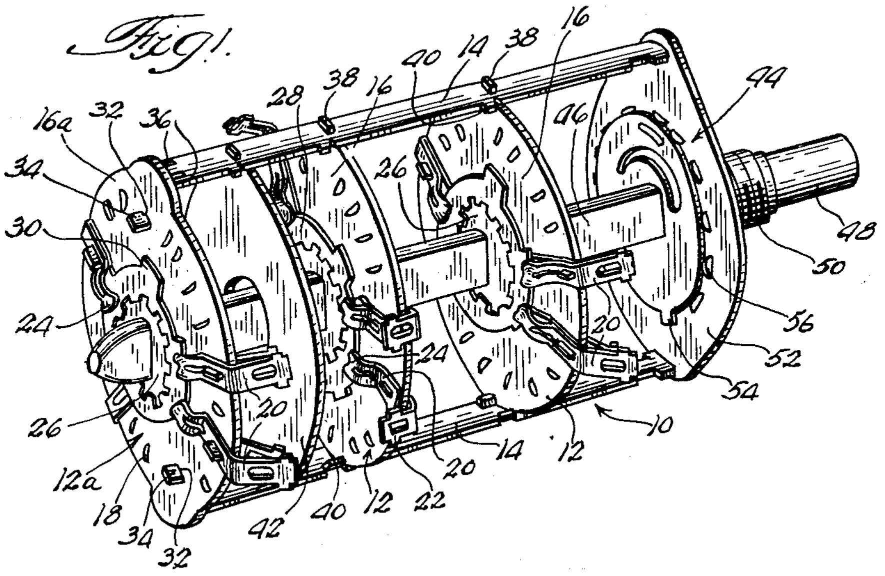
FIGURE 1 is a perspective view of one embodiment of this invention.

Referring now to the drawings, the entire electrical component assembly 10 and all of its essential components are visible in FIG. 1, although the remaining figures will greatly amplify and clarify the specific disclosure.

The component assembly is, in the illustrated embodiment, a rotary switch assembly having a plurality of aligned switch sections 12 assembled between two arcuate struts 14. Because of the strength and rigidity of the means for interconnecting the switch sections 12 and the struts 14, only two diametrically opposed struts are normally required. However, additional support could be obtained if desired through the use of additional struts.

Each switch section 12 includes an annular wafer or web 16 which is generally formed of a relatively rigid plastic material such as a fibrous sheet impregnated with phenolic. The wafers 16 are generally disk-like with a plurality of apertures 18 formed circumferentially about the periphery. Where desired, contact means 20 of a resilient conductive material are secured to the wafers with a terminal portion 22 extending radially outward for electrical connection to appropriate circuitry and a shaped, resilient contact portion 24 extending radially inward. An insulating central rotary member 26 is secured in each wafer with a conductive annulus 28 secured thereto. The conductive annulus 28 has a pattern of wipers or contacts 30 extending radially outward and engageable with the resilient contacts 24. Thus, as the rotary portion 26 is turned, the wipers 30 engage various contacts 24 in any predetermined pattern. If desired, one or more contacts 24 may extend inwardly to continuously engage the annular portion of the conductive ring 28.

The above description of a single switch section is characteristic both of sections constructed for use in this invention and those employed with the prior art. The manner in which the webs 16 are assembled and secured to the struts 14 distinguishes the instant switch assembly from anything heretofore known. The end switch section 12*a* differs from the remainder of the switch sections and will be described first. Switch section 12*a* has two diagonally opposed rectangular apertures 32 spaced inwardly from the periphery of web 16*a*. Struts 14 adjacent to the end switch section 12*a* are preformed to provide an inwardly extending portion (not visible in FIG. 1) and a longitudinally extended offset portion 34. The offset portion 34 extends through the rectangular aperture 32 and is twisted slightly about its longitudinal axis to lock the end section 12*a* in place. As will be more clearly described, struts 14 are notched and formed to define two spaced feet 36 which abut the inner surface of web 16a to provide a rigid mounting free of any rocking or angular movement.

The switch sections 12, intermediate the ends of the assembly, are provided with a generally circular periphery broken only by two diametrically opposed lugs or protuberances 38. The struts 14 have a slightly arcuate configuration in cross-section which contributes substantially to their strength, their aesthetic value, and the rigidity with which they engage the switch sections 12. The struts 14 are appropriately apertured to snugly receive lugs 38 whereby the circular periphery of webs 16 closely engage and conform to the concave inner surface of the arcuate struts 14. The aperture and lugs 38 are congruent, as are the curved surfaces of the struts and wafers.

While this assembly has a substantial degree of rigidity and strength, it has been found that the over-all rigidity of the switch assembly provided by this invention is greatly enhanced by preforming the edge portion of each strut 14 immediately adjacent to and rearwardly of a switch section so that the preformed portions 40 engage the rearward face of the corresponding switch section 12. For illustrative purposes, the metallic shield 42 is shown assembled in the switch between the end section 12a and the next adjacent section 12. Obviousy, various electrical components could be similarly mounted in a stacked assembly in the same manner.

When the desired electrical components have been assembled between the struts 14, the assembly is completed by positioning a front plate and shaft assembly 44 on the forward end of the struts. The shaft assembly includes a rectangular shaft 46 received by each rotary portion 26 of the various switch sections. Each rotary portion has a central aperture so shaped that it is keyed to the shaft 46 for rotation therewith. The rectangular shaft 46 is integrally connected to a generally cylindrical outer shaft 48 adapted to receive a conventional knob as is well known in the electrical art.

Shaft 48 is rotatably mounted in a threaded bushing 50 which is utilized in mounting the rotary switch assembly 10 on the panel of any desired electronic equipment. Secured to bushing 50 is a front plate 52 to which struts 14 are attached. The front plate 44 also incorporates some detent means such as tab 54 and studs 56 to lock the rotary shaft in the plurality of desired positions for switch actuation.

Figure 2:
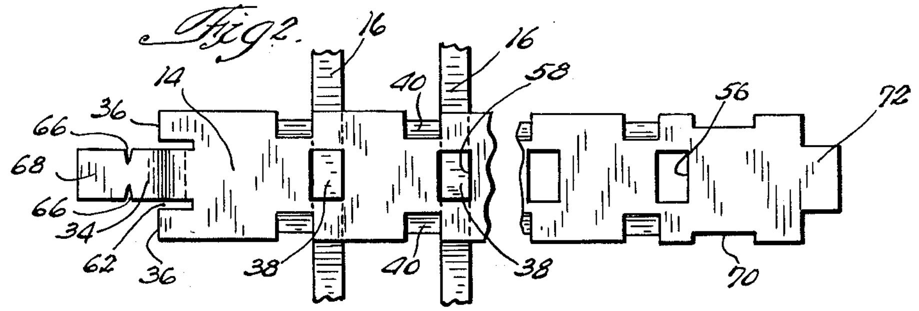
FIG. 2 is a plan view of one strut with portions of two adjacent switch sections shown in association therewith.
Figure 3:
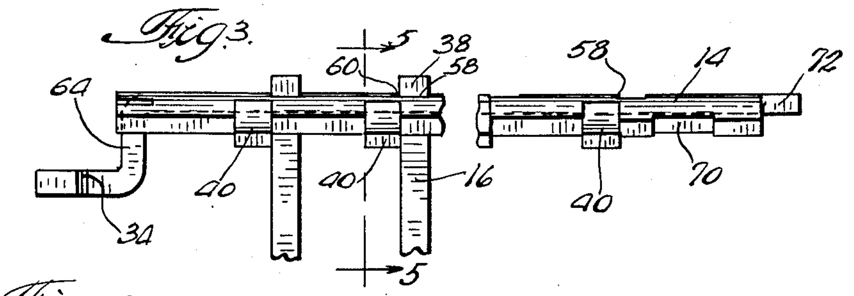
FIG. 3 is an elevational view of the structure shown in FIG. 2.
Figures 4, 5:
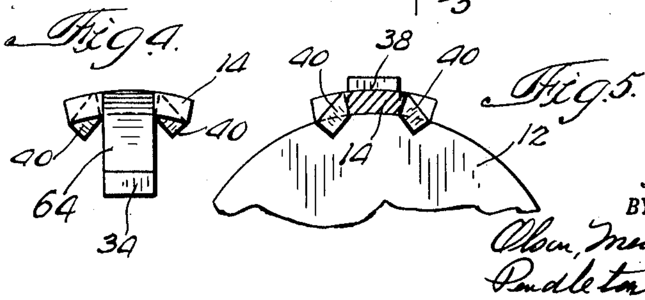
FIG. 4 is an end view of the structure shown in FIG. 3.
FIG. 5 is a sectional view taken along the line 5—5 of FIG. 3.

Certain important details of the switch assembly will now be described in greater detail, with particular reference to the remaining figures. In FIGS. 2 and 3, a strut 14 is illustrated with two webs 16 in position thereon. The tabs 38 can be seen extending through the corresponding apertures 58 centrally disposed along the strut axis. Adjacent to each aperture 58, the edge portions of the strut 14 are preformed to provide locking protuberances 40. The locking protuberances 40 are immediately adjacent the corresponding aperture 38 in the direction of the end section 12a and, as shown in FIGS. 2 and 3, the struck-out protuberance 40 slightly overlies the rectangular aperture 38 to produce a rigid interference fit with the web 16. This interference fit provided by the small space 60 is in the order of .005 inch.

The rearward end of the struts is also clearly illustrated in FIGS. 2 and 3 where it can be seen that the edge portions terminate in feet 36 defined by small slots 62. The central portion of the strut is preformed downwardly to form a transverse portion 64 from which the offset longitudinal portion 34 extends. The free end of offset portion 34 is notched as at 66 to define a key 68. The notches 66 are spaced from the ends of feet 36 a distance slightly less than the thickness of web 16a. When the end switch 12a is placed on the offset portion 34 of two struts and the keys 68 are twisted slightly about their longitudinal axis, the edges of the key 68, defined by notches 66, engage the outer or free surface of wafer 12a to produce locking engagement of the wafer against feet 36. This locking engagement is clearly shown in the fragmentary view of FIG. 9.

Figures 6, 7, 8, 9, 10:
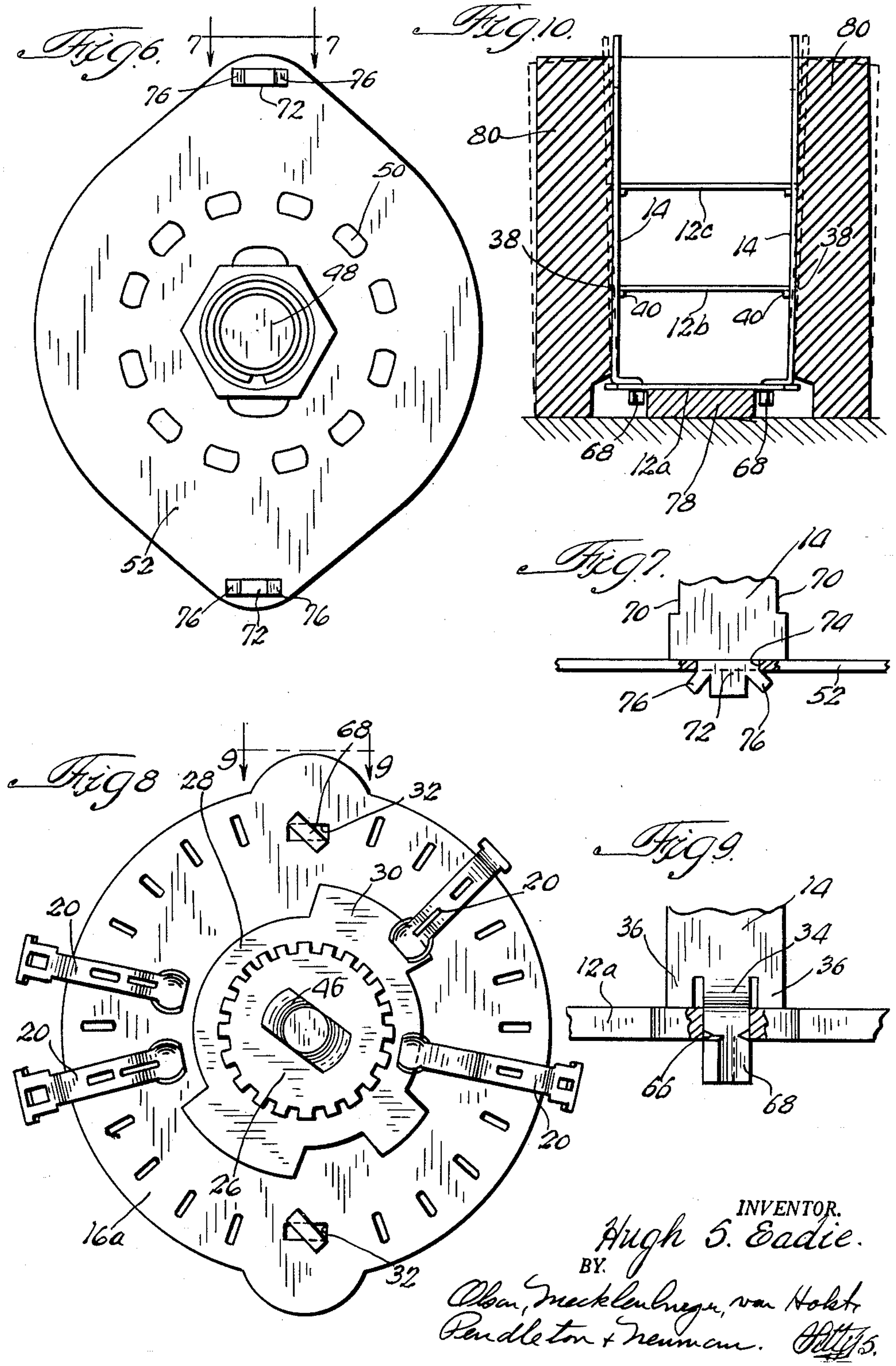
FIG. 6 is a front end view of the embodiment of FIG. 1 showing the central shaft.
FIG. 7 is a fragmentary view of the means for connecting the struts to the front member, taken along the line 7—7 of FIG. 6.
FIG. 8 is a rear end view of the embodiment of FIG. 1 showing the end switch section.
FIG. 9 is a fragmentary view of the means for securing the struts to the last switch section.
FIG. 10 illustrates the means and method of assembling the switch assembly in accordance with the teaching of this invention.

As already described, when all of the switch sections 12 have been positioned, the front assembly, including shaft 46 and front plate 52, is positioned on the strut and switch assembly. The manner in which the struts 14 are secured to front plate 52 is illustrated in FIGS. 6 and 7. Each strut 14 has rectangular notches 70 formed in the edges thereof immediately adjacent the front end. The front end is of reduced cross-section to define a support 72 which extends through a corresponding aperture 74 in the front plate 52. In assembly the rectangular notches 70 are radially engaged by a supporting brace. A staking tool is applied to the free end of support 72 to furcate that support and provide locking tines 76 which engage the forward surface of front plate 52.

The manner of assembly is diagrammatically illustrated in FIG. 10. The illustration constitutes a manual means of assembly, but it is believed manifest that the technique may be readily adapted to automation. The end switch section 12a is first secured to struts 14 by twisting keys 68 as already described. This unit is then placed on base 78 with the struts 14 extending upwardly and urged slightly inwardly by resilient supporting walls 80. The struts 14 are so positioned and supported that they will move outwardly under slight pressure to receive additional switch sections 12. As section 12b is moved downwardly between the struts 14 with protuberances 38 aligned therewith, it is believed obvious that the protuberances 38 will snap into position within the corresponding apertures in struts 14 as the switch section 12 assumes its final position resting on struck-out portions 40. A similar technique is followed with additional switch sections, such as 12c, until the entire assembly is completed. The shaft and front plate assembly 44 may then be dropped into position from above and finally secured in place with the appropriate staking tool.

While one particular rotary switch assembly has been described in this specification, it is believed obvious that the teaching is equally applicable to many known electrical components. Any number of combinations of component sections, contacts, shields, or the like may be readily incorporated in a single assembly. Also, it will be apparent that, because of the integral metallic assembly between the struts 14 and the front plate assembly 44, the instant invention is well shielded and not subject to spurious electrical interference. Also, while the assembly method described is somewhat rudimentary and adapted for hand operation, one skilled in the art will immediately recognize that the assembly might be readily applied to automatic machinery.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. An electrical component assembly comprising a plurality of elongate apertured strut means disposed in generally parallel spaced relationship, a plurality of electrical components supported in said assembly in spaced relationship, each component including substantially flat web means of insulation material disposed between said strut means and an associated rotary portion mounted thereon; and means for rigidly supporting said web means transversely between said strut means comprising protuberance means extending outwardly from said web means adjacent said strut means, said strut means having apertures adapted to snugly receive the corresponding protuberance means, and struck-out portions along each edge of each of said strut means immediately adjacent to one surface of said web means but spaced from said protuberance means and said apertures and partially overlying and engaging said web means for support against movement relative to said strut means.

2. An electrical switch assembly comprising a plurality of elongate apertured strut means disposed in generally parallel spaced relationship, a plurality of switch sections transversely secured intermediate said strut means, each of said sections comprising annular web means of insulation material, conductive contact means secured to said web means, and a central rotary portion having conductive means engageable with said contact means, and means for rigidly supporting at least one of said web means comprising protuberance means extending outwardly from said web means adjacent said strut means, said strut means having apertures adapted to snugly receive the corresponding protuberance means, and struck-out portions along each edge of each of said strut means immediately adjacent to one surface of said web means and partially overlying and engaging said web means but spaced from said protuberance means and said apertures for support of said web means against movement relative to said strut means.

3. An electrical switch assembly comprising a plurality of elongate apertured strut means disposed in generally parallel spaced relationship, said elongate strut means having an arcuate transverse cross section, the concave surfaces thereof being directed inwardly, a plurality of switch sections transversely secured intermediate said strut means, each of said sections comprising annular web means of insulation material, conductive contact means secured to said web means, and a central rotary portion having conductive means engageable with said contact means, shaped end portions on each of said strut means, said shaped end portions extending through corresponding apertures in one of said web means and having a preformed portion to lock said strut means in said one web means, and means for rigidly supporting at least one other of said web means comprising protuberance means extending outwardly from said web means adjacent said strut means, said strut means having apertures adapted to snugly receive the corresponding protuberance means, and struck-out portions along each edge of each of said strut means immediately adjacent to one surface of said web means and partially overlying and engaging said web means but spaced from said protuberance means and said apertures for support of said web means against movement relative to said strut means.

4. The electrical switch assembly of claim 3 wherein said shaped end portions comprise a transverse portion abutting one surface of said one web means, and an offset longitudinal portion extending from said transverse portion and extending through an aperture in said one web means.

5. The electrical switch assembly of claim 4 wherein said offset longitudinal portion extends through said one web means and is distorted about its longitudinal axis for locking engagement with said one web means.

6. The electrical switch assembly of claim 5 wherein said offset longitudinal portion is of reduced cross section at a position spaced from said transverse portion a distance slightly less than the thickness of said one web means.

7. The electrical switch assembly of claim 6 wherein said transverse portion is of reduced width and preformed inwardly whereby said strut means defines two spaced feet which rigidly engage said one surface and support said one web means.

8. An electrical switch assembly comprising a plurality of elongate apertured strut means disposed in generally spaced relationship, a switch section transversely secured intermediate said strut means including annular web means of insulation material, conductive contact means secured to said web means, and a central rotary portion having conductive means engageable with said contact means, and means rigidly securing said web means to said strut means comprising a transverse portion of said strut means lying adjacent one surface of said web means, an offset longitudinal portion extending from said transverse portion through an aperture in said web means, said offset longitudinal portion having a reduced cross section at a position spaced from said transverse portion a distance slightly less than the thickness of said one web means, and a portion of said strut means extending beyond said longitudinal portion and said web means, twisted about its longitudinal axis to lockingly engage said web means.

9. The electrical switch assembly of claim 8 wherein said transverse portion is of reduced width and deformed inwardly whereby said strut means defines two spaced feet which rigidly engage said one surface and support said one web means.

References Cited in the file of this patent

UNITED STATES PATENTS

| | | |
|---|---|---|
| 2,133,916 | Churchill | Oct. 18, 1938 |
| 2,428,948 | Torsch et al. | Oct. 14, 1947 |
| 2,594,190 | Mastney | Apr. 22, 1952 |
| 2,641,050 | Graybill et al. | June 9, 1953 |
| 2,666,253 | Morberg | Jan. 19, 1954 |
| 2,718,623 | Toder et al. | Sept. 20, 1955 |
| 2,777,893 | DeRosso | Jan. 15, 1957 |
| 2,801,377 | Selbmann et al. | July 30, 1957 |
| 2,817,723 | Allison | Dec. 24, 1957 |
| 2,821,580 | Black | Jan. 28, 1958 |
| 2,828,393 | Wingard | Mar. 25, 1958 |
| 2,832,130 | Harvey | Apr. 29, 1958 |
| 2,845,501 | George | July 29, 1958 |
| 2,869,107 | Engel | Jan. 13, 1959 |
| 2,870,276 | Gelzer | Jan. 20, 1959 |
| 2,900,461 | Allison | Aug. 18, 1959 |

FOREIGN PATENTS

| | | |
|---|---|---|
| 805,276 | Great Britain | Dec. 3, 1958 |